United States Patent
Baker et al.

(10) Patent No.: US 11,945,366 B2
(45) Date of Patent: Apr. 2, 2024

(54) DELIVERY LIGHTING

(71) Applicant: Rivian IP Holdings, LLC, Irvine, CA (US)

(72) Inventors: Simon Baker, Hampshire (GB); Vijay Jayaraman, Irvine, CA (US); Nicholas Paul Tokarz, San Jose, CA (US); Srikanth Amruthur, Farmington Hills, MI (US); Emily Wilson, Irvine, CA (US); Thomas French, Commerce Township, MI (US); Stuart Brown, Wilshire (GB)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/848,651

(22) Filed: Jun. 24, 2022

(65) Prior Publication Data

US 2023/0415640 A1 Dec. 28, 2023

(51) Int. Cl.
*B60Q 1/46* (2006.01)
*B60Q 1/30* (2006.01)
*B60Q 1/48* (2006.01)

(52) U.S. Cl.
CPC ............... *B60Q 1/46* (2013.01); *B60Q 1/30* (2013.01); *B60Q 1/486* (2013.01)

(58) Field of Classification Search
CPC ............. B60Q 1/46; B60Q 1/30; B60Q 1/486
See application file for complete search history.

(56) References Cited

U.S. PATENT DOCUMENTS

| 8,322,902 | B2 | 12/2012 | Martin et al. |
| 8,789,991 | B2 | 7/2014 | Martin et al. |
| 9,121,566 | B2 | 9/2015 | De Lamberterie |
| 11,518,298 | B2 * | 12/2022 | Cobb .................... B60W 10/30 |
| 2005/0099286 | A1 * | 5/2005 | DeYoung ................. B60Q 1/46 340/463 |
| 2008/0258899 | A1 * | 10/2008 | Stiles ..................... B60Q 1/305 340/471 |
| 2017/0028795 | A1 * | 2/2017 | Schlaupitz ............. B60Q 1/482 |
| 2020/0189453 | A1 * | 6/2020 | Tucker ................ F21V 23/0407 |
| 2021/0171041 | A1 * | 6/2021 | Son ............................ B60L 7/26 |
| 2022/0324380 | A1 * | 10/2022 | Cobb ....................... B60Q 1/52 |

FOREIGN PATENT DOCUMENTS

| EP | 2161494 A1 | 3/2010 |
| EP | 2792940 A2 | 10/2014 |
| EP | 2098774 B1 | 7/2020 |

\* cited by examiner

*Primary Examiner* — Mohamed Barakat
(74) *Attorney, Agent, or Firm* — BAKERHOSTETLER

(57) ABSTRACT

A vehicle control system may include one or more processors and a memory comprising instructions executable by the processors, the processors operable to execute the instructions to perform operations comprising detecting a signal to activate vehicle lamps in a delivery lighting pattern. In some embodiments, the processors may be further operable to execute the instructions to perform operations including activating the vehicle lamps in the delivery lighting pattern, wherein a flashing frequency of the delivery lighting pattern differs from a flashing frequency of a hazard lighting pattern.

20 Claims, 7 Drawing Sheets

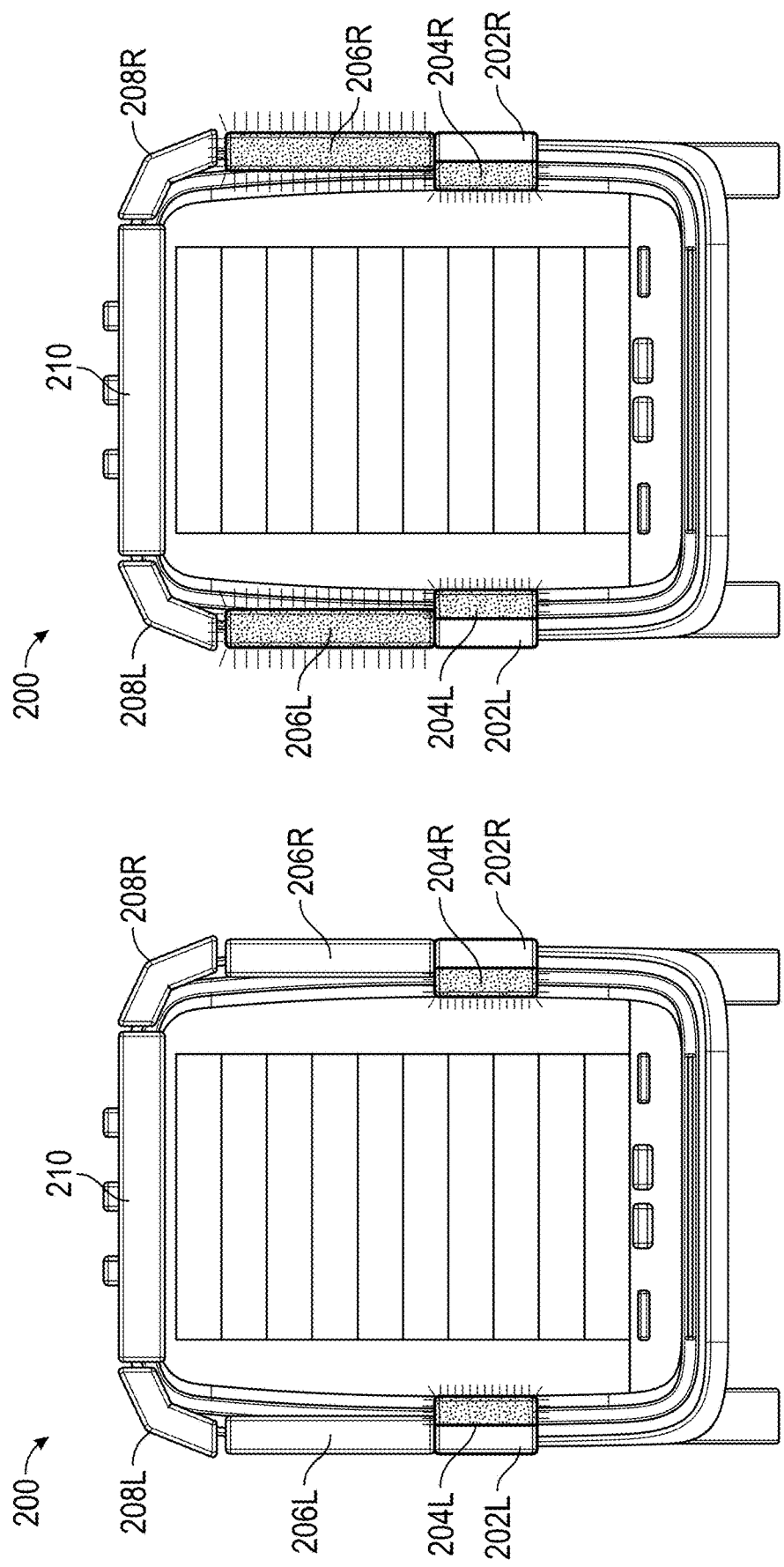

DELIVERY LIGHTING

INTRODUCTION

Hazard lighting raises a vehicle's visibility to surrounding drivers and pedestrians. A vehicle operator can elect to activate a hazard lighting pattern to alert oncoming drivers and pedestrians that the vehicle is experiencing an emergency, the vehicle presents a hazard to other drivers (such as an unusual parking position when delivering a package), or the vehicle is experiencing a fault (such as a wiring interruption that impedes lamp operation).

BRIEF SUMMARY

Embodiments of the present invention are directed to vehicle control systems, methods, and computer readable mediums for activating vehicle lamps in a delivery lighting pattern. The delivery lighting pattern can advantageously provide additional awareness to oncoming drivers and pedestrians. In some embodiments, the delivery lighting pattern differs from a hazard lighting pattern. For example, a flashing frequency of the delivery lighting pattern differs from a flashing frequency of the hazard lighting pattern (for example, a flashing frequency of the delivery lighting pattern differs by at least 1 Hz from the flashing frequency of the hazard lighting pattern). In some examples, the control system activates, in the delivery lighting pattern, an additional lamp that is not activated in the hazard lighting pattern.

In some embodiments, a control system includes one or more processors and a memory, the memory including instructions executable by the processors. The processors may be operable to execute the instructions to perform operations which include detecting a signal to activate vehicle lamps in a delivery lighting pattern. The processors may also be operable to execute the instructions to perform operations which include activating the vehicle lamps in the delivery lighting pattern.

As noted, the delivery lighting pattern, in some examples, differ from the hazard lighting pattern by changing a flashing frequency or by activating additional lamps. The additional lamps are exterior lamps, interior lamps, or both. In some embodiments, the additional lamps are positioned at the rear of a vehicle (e.g., tail lamps).

In some aspects, the processors are operable to execute the instructions to perform operations to determine occurrence of a delivery event and, in response to determining occurrence of the delivery event, send the signal to activate the vehicle lamps in the delivery lighting pattern. In addition or in the alternative, some aspects include processors operable to execute the instructions to perform operations to determine the vehicle is in a parked mode and, in response to determining the vehicle is in a parked mode, send the signal to activate the vehicle lamps in the delivery lighting pattern. In addition or in the alternative, processors are operable to execute the instructions to perform operations to determine the vehicle's parking brake is engaged and, in response to determining the vehicle's parking brake is engaged, send the signal to activate the vehicle lamps in the delivery lighting pattern. In addition or in the alternative, processors are operable to execute the instructions to perform operations to determine the vehicle is slowing and approaching a curb and, in response to determining vehicle is slowing and approaching a curb, send the signal to activate the vehicle lamps in the delivery lighting pattern. Processors are, in some examples, operable when executing the instructions to perform operations to determine the vehicle is stopped by regenerative braking and, in response to determining the vehicle is stopped by regenerative braking, send the signal to activate the vehicle lamps in the delivery lighting pattern. In another example, the processors are operable when executing the instructions to perform operations to determine a current location of the vehicle is within a threshold proximity of an area associated with a delivery address and, in response to determining a current location of the vehicle is within a threshold proximity of an area associated with a delivery address, send the signal to activate the vehicle lamps in the delivery lighting pattern.

In some embodiments, the processors are operable when executing the instructions to perform operations to detect a user instruction to activate vehicle lamps in the delivery lighting pattern. In some of the embodiments that include a step of detecting a user instruction to activate vehicle lamps in the delivery lighting pattern, detecting the signal to activate vehicle lamps in a delivery lighting pattern includes determining the vehicle is in a parked mode and, in response to determining the vehicle is in a parked mode, sending the signal to activate the vehicle lamps in the delivery lighting pattern. In yet further embodiments where the processors are operable when executing the instructions to perform operations to detect a user instruction to activate vehicle lamps in the delivery lighting pattern, detecting the signal to activate vehicle lamps in a delivery lighting pattern includes determining occurrence of at least one event, and, in response to determining occurrence of the at least one event, sending the signal to activate the vehicle lamps in the delivery lighting pattern. Determining occurrence of at least one event may include, for example, at least one event selected from a vehicle parking brake is engaged, a vehicle is slowing and approaching a curb, a vehicle is stopped by regenerative braking, and a current location of the vehicle is within a threshold proximity of an area associated with a delivery address.

In certain embodiments, the control system's processors are further operable when executing the instructions to perform operations to: determine occurrence of a crash event, determine a vehicle lamp activated in the hazard lighting pattern is inoperative, and activate the vehicle lamps in a special lighting pattern that differs from the hazard lighting pattern. In some such embodiments, the special lighting pattern is the same as a delivery lighting pattern. In some embodiments with an activated special lighting pattern, an additional lamp is activated, where the additional lamp is not activated in the hazard lighting pattern.

In some implementations of the control system, the processors are operable when executing the instructions to perform operations to detect a signal to deactivate vehicle lamps in the delivery lighting pattern and, in response, deactivate the vehicle lamps. In some implementations, deactivating the vehicle lamps in the delivery lighting condition includes activating the hazard lighting pattern or deactivating some or all activated vehicle lamps. The signal to deactivate can include a signal indicating a change in parked mode, a signal indicating a disengaged parking brake, a signal indicating a moving vehicle, a signal indicating a vehicle is departing from a curb, and a signal indicating the vehicle lamps are deactivated from the hazard lighting pattern.

The processors may also be operable to determine that the vehicle lamps are activated in a hazard lighting pattern and, in response to determining the vehicle lamps are activated in the hazard lighting pattern and detecting a signal to activate vehicle lamps in a delivery lighting pattern, activating the vehicle lamps in the delivery lighting pattern. In some aspects, the processors are operable when executing the instructions to perform operations to determine occurrence of at least one event and, in response to determining occurrence of the at least one event, activate a hazard lighting pattern. The event can include a collision event, a critical stop event, or a thermal event.

The processors are, in some implementations, operable when executing the instructions to perform operations to determine occurrence of a component failure and, in response to determining occurrence of the component failure, activate the vehicle lamps at a flashing frequency that is different from the flashing frequency of the hazard lighting pattern and the flashing frequency of the delivery lighting pattern.

In some aspects, one or more computer-readable non-transitory storage media embodying software may include instructions operable when executed to perform operations to: detect, by a control system, a signal to activate vehicle lamps in a delivery lighting pattern; and activate the vehicle lamps in the delivery lighting pattern. The delivery lighting pattern may, in some aspects, including a flashing frequency that differs from a flashing frequency of a hazard lighting pattern. In some embodiments, the flashing frequency of the delivery lighting pattern differs by at least 1 Hz from the flashing frequency of the hazard lighting pattern.

In further embodiments, the one or more computer-readable non-transitory storage media are operable when executed to perform operations including: activate, in the delivery lighting pattern, an additional lamp that is not activated in the hazard lighting pattern. In some embodiments of the one or more computer-readable non-transitory storage media, the instructions are further operable when executed to perform operations including: detect, by the control system, a signal to deactivate vehicle lamps in the delivery lighting pattern, wherein the signal to deactivate includes at least one signal selected from the group consisting of a signal indicating a change in parked mode, a signal indicating the vehicle is departing from a curb, a signal indicating a moving vehicle, and a signal indicating deactivated hazard lamps; and deactivate the delivery lighting pattern.

In some embodiments, a vehicle includes a plurality of lamps and a control system. The control system can include one or more processors and a memory including instructions executable by the processors, the processors operable to execute the instructions to perform operations including: detect, by the control system, a signal, from a sensor of the plurality of sensors, to activate vehicle lamps of the plurality of lamps in a delivery lighting pattern and activate the vehicle lamps in the delivery lighting pattern. A flashing frequency of the delivery lighting pattern differs, in some embodiments, from a flashing frequency of a hazard lighting pattern. In some embodiments, the flashing frequency of the delivery lighting pattern differs by at least 1 Hz from the flashing frequency of the hazard lighting pattern. In some embodiments, the processors are further operable to activate, in the delivery lighting pattern, an additional lamp that is not activated in the hazard lighting pattern. Detecting the signal to activate vehicle lamps in a delivery lighting pattern further includes, in some embodiments: determining occurrence of at least one event selected from the group consisting of a vehicle is in a parked mode, a vehicle parking brake is engaged, a vehicle is slowing and approaching a curb, a vehicle is stopped by regenerative braking, and a current location of the vehicle is within a threshold proximity of an area associated with a delivery address; and in response to determining occurrence of the at least one event, sending the signal to activate the vehicle lamps in the delivery lighting pattern.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a control system, a computer readable medium, and a vehicle, wherein any feature mentioned in one claim category, e.g. device, can be claimed in another claim category, e.g. control system, computer readable medium, vehicle, and method, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim or in any combination with any embodiment or feature described or depicted herein or with any of the features of the attached claims.

BRIEF DESCRIPTION OF THE DRAWINGS

FIG. 2A illustrates an example system for activating rear vehicle lamps in a hazard lighting pattern.

FIG. 2B illustrates an example system for activating rear vehicle lamps in a delivery lighting pattern.

DESCRIPTION OF EXAMPLE EMBODIMENTS

Embodiments of the present invention are directed to vehicle control systems, computer readable mediums, and vehicles that activate vehicle lamps in a delivery lighting pattern. In some embodiments, the delivery lighting pattern differs from a hazard lighting pattern. For example, a flashing frequency of the delivery lighting pattern can differ from a flashing frequency of the hazard lighting pattern. In some examples, the flashing frequency of the delivery lighting pattern differs by at least 1 Hz from the flashing frequency of the hazard lighting pattern. In some examples, the control system activates, in the delivery lighting pattern, an additional lamp that is not activated in the hazard lighting pattern.

Figure 1:
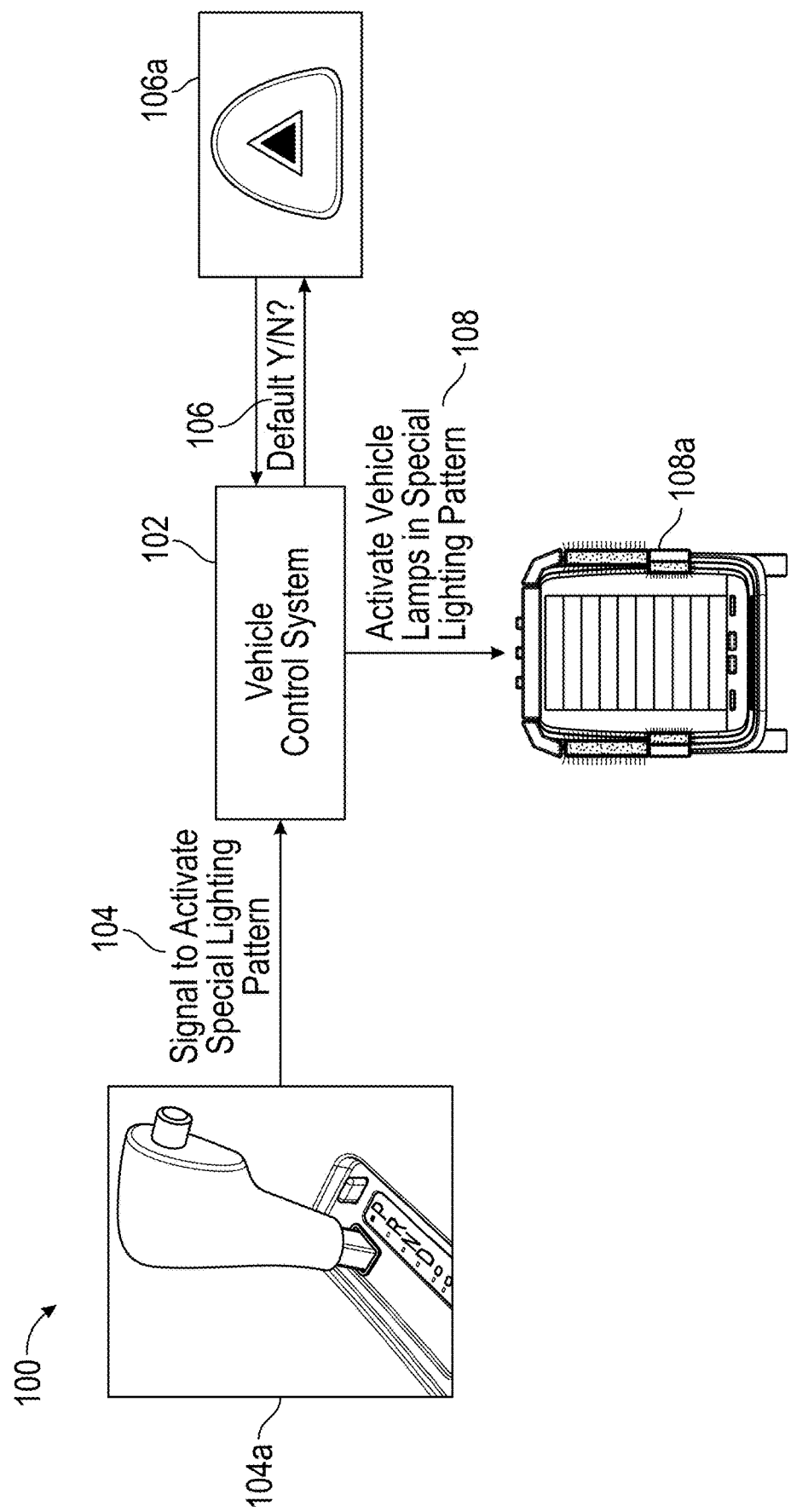
FIG. 1 illustrates an overview of an example control system environment for activating vehicle lamps in a delivery lighting pattern.

FIG. 1 illustrates an overview of an example control system environment 100 for activating vehicle lamps in a delivery lighting pattern. The delivery lighting pattern can advantageously alert oncoming drivers and pedestrians that the vehicle is in a delivery situation. Further, the vehicle can activate a delivery lighting pattern in response to detecting a signal, including signals indicating a delivery event has occurred.

Control system 102 can be installed in a vehicle (e.g., vehicles illustrated in FIGS. 2A, 2B, 3A, 3B, and 6) that includes a plurality of vehicle lamps and a plurality of sensors. The vehicle may include any passenger vehicle (e.g., a car, a truck, a pickup truck, a sports utility vehicle (SUV), a minivan, a crossover utility vehicle (CUV), a cargo van, a towing truck) that may be utilized for transportation and to navigate one or more rural environments, urban environments, and/or off-roading and mountainous environments. In one embodiment, the vehicle may include a gasoline-powered vehicle that may be propelled, for example, by an internal combustion engine (ICE) or other fuel-injection engine. In certain embodiments, the vehicle may include, for example, an electric vehicle (EV), a battery electric vehicle (BEV), a hybrid electric vehicle (HEV), a plug-in hybrid electric vehicle (PHEV), or other vehicle that may be in part or wholly propelled by one or more electric motors (e.g., synchronous electric motors, permanent magnet synchronous electric motors (PMSM)) utilizing power stored to one or more batteries included in the vehicle. In some embodiments, the vehicle may include an autonomous or semi-autonomous vehicle suitable for operating, for example, in accordance with Level-3 autonomous driving, Level-4 autonomous driving, Level-5 autonomous driving, or switching between the different levels of autonomous driving functionality.

In some embodiments, a control system includes one or more processors and a memory including instructions executable by the processors. The processors may be operable to execute the instructions to perform operations including sending/receiving/detecting signals, determining the state(s) of the vehicle, and controling (e.g., activating and deactivating) components of the vehicle. The vehicle could include one control system for the vehicle or multiple control systems each assigned a subset of the vehicle's controls. In some embodiments, vehicle control systems include one or more of an autonomous control system (e.g., to control vehicle safety in autonomous driving mode, integrate sensors during autonomous driving mode, monitor driver awareness, provide parking assistance), a battery control system (e.g., to determine battery health, determine state of charge, determine battery voltage, determine temperature, determine current, control charging, isolate battery packs, balance battery cells), a body control system (e.g., to control seat positions, control seat heat and ventilation, control steering column positions, control doors, control windows, control mirrors, determine ambient temperature), a telematics control system (e.g., to control vehicle wireless communication, provide navigation function), a thermal management control system (e.g., to control heating and cooling of a battery, control cooling of drive units, control heating, ventilation, and air conditioning (HVAC) and vents, sense cabin temperature, to sense temperature of and control cooling of powertrain, interior and exterior vehicle lamps, control horn, control wipers), and a vehicle dynamics control system (e.g., to control propulsion, control active damper, control air suspension of vehicle, control vehicle acceleration, control regeneration, determine torque distribution, control traction, control drive modes, determine odometer, control damping, control an emergency parking brake, receive signals from proximity sensors, receive signals from a P-R-N-D stalk).

Control system 102 can be any vehicle control system capable of activating vehicle lamps. A vehicle control system may activate a vehicle lamp directly (for example, by sending a signal directly to the respective vehicle lamp) or indirectly (for example, by sending a signal to another control system which relays the signal to other components in the vehicle, such as the vehicle lamp). In some embodiments, the control system 102 detects a signal 104 to activate vehicle lamps in a delivery lighting pattern. In FIG. 1, an exemplary source of the signal is gear shift 104a (or an associated P-R-N-D stalk, or an associated vehicle dynamics control system).

In FIG. 1, gear shift 104a is in parked mode, causing a signal 104 to be sent to control system 102. As illustrated in FIG. 1, gear shift 104a is a standard P-R-N-D (Park-Reverse-Neutral-Drive) gear shift. Other gear shifts could be used, such as a gear shift interface on a human machine interface (HMI). In further embodiments, the state (P-R-N-D) of the gear shift 104a is stored in a memory of the vehicle, including a memory of control system 102. When a user changes gear shift 104a, the memory is updated to reflect the P-R-N-D state of the vehicle. In such embodiments, control system 102 can then determine the vehicle is in a parked mode by accessing the memory and determining whether the vehicle's state is P, R, N, or D or determining the "P" state of the vehicle (e.g., "P" is flagged as "yes" or "no"). In other embodiments, when a user changes gear shift 104a, the "P" state of the vehicle (e.g., "P" is "yes"/"no") is communicated to control system 102 and detected as a signal to activate vehicle lamps in a delivery lighting pattern. Further, gear shift 104a is an exemplary source of a vehicle's parked mode; other vehicle components may provide a parked mode status, in addition to or in lieu of gear shift 104a.

Parked mode is an exemplary signal that activates vehicle lamps in a delivery lighting pattern. Other embodiments can use different signals, in addition or in the alternative to the parked mode signal. For example, a parked mode may also include a stopped mode where the vehicle is stopped and the regenerative braking maintains the vehicle in a stationary position, even when the vehicle is parked on a hill, mountain, and/or ramp. In some embodiments, a control system determines occurrence of a delivery event and, in response to determining occurrence of the delivery event, a signal is sent to activate the vehicle lamps in the delivery lighting pattern. In some embodiments, the control system that determines occurrence of the delivery event and sends the signal is different from the control system (e.g., control system 102) that activates the vehicle lamps. In other embodiments, the control system is the same, in which case the signal sent to activate vehicle lamps and the signal detected to activate vehicle lamps are within the control system, such as signals sent between different modules or sub-systems of the control system. In some embodiments, a signal to activate vehicle lamps in a delivery lighting pattern is sent in response to determining the "P" state of a vehicle (as described above with respect to signal 104 and gear shift 104a). In some embodiments, a signal to activate vehicle lamps in a delivery lighting pattern is sent in response to determining the status of a vehicle parking brake (e.g., using a vehicle dynamics control system). In such embodiments, control system 102 determines the status by accessing a memory (including a memory of control system 102) and determines whether the parking brake is engaged (e.g., "Parking Brake Engaged" is flagged as "yes" or "no"). In other embodiments, when a user engages/disengages the parking brake, the state of the parking brake (e.g., "parking brake engaged/disengaged") is communicated to control system 102. A vehicle's regenerative braking may also be used as a source of a signal to activate vehicle lamps in a delivery lighting pattern. With regenerative braking systems, a vehicle can actively slow its movement to convert kinetic energy of the vehicle into stored energy (e.g., battery charge) for later use. In some vehicles, a regenerative braking system can bring a vehicle to a complete stop. In such vehicles, a control system (such as a vehicle dynamics control system) can determine the regenerative braking system has brought the vehicle to a complete stop and, in response, send a signal to activate vehicle lamps in a delivery lighting pattern. Also, in vehicles with regenerative braking, a control system (such as a vehicle dynamics control system) can determine the regenerative braking system has slowed the vehicle below a threshold speed and, in response, send a signal to activate vehicle lamps in a delivery lighting pattern. In some implementations, a signal to activate vehicle lamps in a delivery lighting pattern is sent in response to determining a current location of the vehicle is within a threshold proximity of an area associated with a delivery address. For example, a telematics control system (e.g., a global positioning system or other geolocation system) can identify the current location of the vehicle and another system can determine an area surrounding a delivery address (e.g., a parcel of land associated with the delivery address). Control system 102 can send a signal to activate vehicle lamps in a delivery lighting pattern in response to determining the difference between the vehicle's current location and the area surrounding a delivery address is less than a threshold, for example, less than 500 m. In some embodiments, a signal to activate vehicle lamps in a delivery lighting pattern is sent in response to determining a vehicle is slowing down and approaching a curb. In such embodiments, control system 102 determines a vehicle's speed by accessing a speedometer of the vehicle and determines a vehicle is approaching a curb by a proximity sensor of the vehicle. In some other embodiments, vehicle occupant actions within the vehicle interior triggers a signal to activate vehicle lamps in a delivery lighting pattern. For example, when a control system determines that a vehicle occupant (e.g., a driver or non-driver) has unbuckled a seat belt (e.g., detecting that a seat belt has changed from a "buckled" state to an "unbuckled" state), has risen from a chair (e.g., detecting that a seat has changed from an "occupied" state to an "unoccupied" state), and/or has opened a door of the vehicle (e.g., detecting that a vehicle door has changed from a "closed" to an "opened" state), the signal may be sent. In some embodiments, the control system that determines occurrence of an event (such as a delivery event, parked mode change, parking brake engaged/disengaged, vehicle slowing and approaching a curb, etc.) and sends the signal is different from the control system (e.g., control system 102) that activates the vehicle lamps. In other embodiments, the control system is the same, in which case the signal sent to activate vehicle lamps and the signal detected to activate vehicle lamps are within the control system, such as signals sent between different modules or sub-systems within a control system.

Control system 102, in some implementations, optionally determines that vehicle lamps are activated in a hazard lighting pattern. In environment 100, vehicle control system 102 determines the vehicle lamps are activated in the hazard pattern by sending and detecting signals 106 to hazard button 106a. Signal 106 is exemplary. Control system 102 can use other approaches to determining vehicle lamps are activated in a hazard lighting pattern. In some embodiments, control system 102 determines the vehicle lamps are activated in a hazard lighting pattern in response to a user pressing a physical hazard button 106a and the vehicle sends a signal to control system 102 that the vehicle lamps are activated in the hazard pattern. In further embodiments, the state (On/Off) of the hazard button 106a is stored in a memory of the vehicle, including a memory of control system 102. In such embodiments, control system 102 determines the vehicle lamps are activated in a hazard lighting pattern by accessing the memory (e.g., a memory of control system 102) and determining the state of the hazard button. Further, hazard button 106a is an exemplary source for activating a hazard lighting pattern. In some embodiments, the hazard lighting pattern is activated by determining occurrence of an event. The event could be a collision event. In such embodiments, the source of the signal could be, for example, a restraint module. Another exemplary event includes a critical stop event, the source of which could be, for example, a powertrain module. In such embodiments, a powertrain module detects a vehicle failure and sends a signal to the control system 102 (or other system) to activate the hazard lighting pattern. Yet another exemplary event is a thermal event. For example, control system 102 may detect a signal that a vehicle fire (e.g., engine overheating, wiring current exceeds threshold) is imminent. Other failure events could also be used to activate the hazard lighting pattern. In all such embodiments, determining occurrence of the at least one event (such as a collision event, a critical stop event, a thermal event, other failure, etc.) results in activating the hazard lighting pattern and producing a signal 106 that control system 102 detects to determine the hazard lighting pattern is activated.

In some embodiments where control system 102 optionally determines that vehicle lamps are activated in a hazard lighting pattern, control system 102 activates the vehicle lamps in the delivery lighting pattern when the control system 102 detects a signal to activate vehicle lamps in a delivery lighting pattern and determines that the vehicle is in a hazard lighting pattern. In some embodiments, control system 102 detects the signal and makes the determinations simultaneously. In others, the control system 102 does not detect and make determinations simultaneously. In some embodiments, control system 102 detects the signal to activate the vehicle lamps in a delivery lighting pattern and determines that the vehicle is not activated in a hazard lighting pattern. In response to a later determination that the vehicle is activated in a hazard lighting pattern (and the signal has not been reversed), the vehicle activates the vehicle lamps in the delivery lighting pattern. Using FIG. 1 to illustrate this example, a user may press hazard button 106a first while the vehicle is moving (i.e., gear shift 104a is not in "Park"), then later change the gear shift 104a, thereby causing control system 102 to detect a signal that vehicle lamps are activated in the delivery lighting pattern. Similarly, control system 102 may detect the signal to activate vehicle lamps in the delivery lighting pattern, then later determine the vehicle lamps are activated in the hazard lighting pattern. Again, returning to FIG. 1 for illustration, a user may stop the vehicle and place gear shift 104a in "Park" causing a signal to be detected at control system 102 to activate the lamps in a delivery lighting pattern. If a user then later presses hazard button 106a, control system 102 then activates the vehicle lamps in the delivery lighting pattern.

As noted, the delivery lighting pattern is different from the hazard lighting pattern. This difference can include, for example, changing a flashing frequency of vehicle lamps between the delivery lighting pattern and the hazard lighting pattern, activating additional lamps in the delivery lighting pattern, changing a pulse length or intensity of activated lamps in the delivery lighting pattern so that is different than the hazard lighting pattern's pulse length or intensity, and changing a flashing color of vehicle lamps. In some embodiments, the delivery lighting pattern could be an extended and coordinated lighting pattern with audio feedback, could include projections on a surface (e.g., the vehicle, the road), etc. In some embodiments, the difference between the delivery lighting pattern and hazard lighting pattern is user adjustable. In some embodiments, the flashing frequency of the vehicle lamps in the delivery lighting pattern includes a frequency difference of at least 1 Hz from the hazard lighting pattern. In some embodiments, the flashing frequency difference is at least 4 Hz. For example, if the vehicle lamps are activated lamps at 2 Hz in the hazard lighting pattern, that frequency is increased to at least 6 Hz for the delivery lighting pattern. Some embodiments may include a third flashing frequency different from the hazard lighting pattern's frequency and the delivery lighting pattern's frequency. For example, in addition to a hazard lighting frequency at a first frequency and a delivery lighting pattern (or special lighting pattern, as discussed further below) at a second frequency, some embodiments include a third frequency to represent, for example, a component failure in the vehicle lamps' system (e.g., a wiring fault). Control system 102 can, in some such embodiments, determine an occurrence of a component failure and in response to determining occurrence of the component failure, activate the vehicle lamps at the third flashing frequency. In certain implementations, the hazard lighting pattern activates vehicle lamps at 2 Hz, the delivery lighting pattern activates vehicle lamps at 6 Hz, and the third pattern (e.g., a wiring fault) activates vehicle lamps at 4 Hz. The activated vehicle lamps can be outside the vehicle (as illustrated in FIGS. 3A, 3B, and 4), inside the vehicle, or both.

In some embodiments, control system 102 activates additional lamps in the delivery lighting pattern than are activated in the hazard lighting pattern. The additional lamps can be activated with or without a change of flashing frequency between the delivery lighting pattern and the hazard lighting pattern. FIG. 2A illustrates an example system for activating rear vehicle lamps in a hazard lighting pattern. Vehicle 200 includes left and right rear tail lamps 202L and 202R, left and right rear turn signal lamps 204L and 204R, left and right rear supplemental tail lamps 206L and 206R, left and right rear clearance lamps 208L and 208R, and central clearance lamp 210. In the hazard lighting pattern, left and right rear tail lamps 202L and 202R and left and right turn signals 204L and 204R flash at a first frequency. In the example of FIG. 2A, the left and right turn signals 204L and 204R are the only rear lamps that flash in the hazard lighting pattern. In some embodiments, the flash frequency of left and right turn signals is 2 Hz in a hazard lighting pattern. As explained above, the hazard lighting pattern can be activated via, for example, a user pressing an emergency hazard button and by determining occurrence of certain events (as described herein).

FIG. 2B illustrates an example system for activating rear vehicle lamps in a delivery lighting pattern. In FIG. 2B, vehicle 200 has activated the left and right turn signals 204L and 204R, as in the hazard lighting pattern in FIG. 2A, and additionally activated left and right rear supplemental tail lamps 206L and 206R located above the left and right rear tail lamps 202L and 202R. Thus, vehicle 200 operates vehicles lamps in the delivery lighting pattern differently than in the hazard lighting pattern by activating additional vehicle lamps (in this case left and right rear supplemental tail lamps 206L and 206R). In addition or in the alternative, the activated lamps in the delivery lighting pattern may flash at a second frequency different than the first frequency in the hazard lighting pattern, such as at a frequency at least 1 Hz different than the hazard lighting pattern. In some embodiments, flashing of additional vehicle lamps (in the delivery lighting pattern) is synchronized with the other lamps (those activated in both the delivery lighting pattern and the hazard lighting pattern). In other embodiments, flashing of additional lamps is not synchronized. In some embodiments, the delivery lighting pattern differs from the hazard lighting pattern by a flash type, such as pulse length or pulse intensity. In some embodiments, the delivery lighting pattern includes audible and visual feedback inside the vehicle, to alert the driver that the vehicle lamps are activated in the delivery lighting pattern. For example, interior lamps (e.g., lamps on a HMI) or sounds can be activated at a same frequency as the flash frequency of the external lamps in the delivery lighting pattern. Some embodiments include audible alerts outside the vehicle.

Figure 3A:
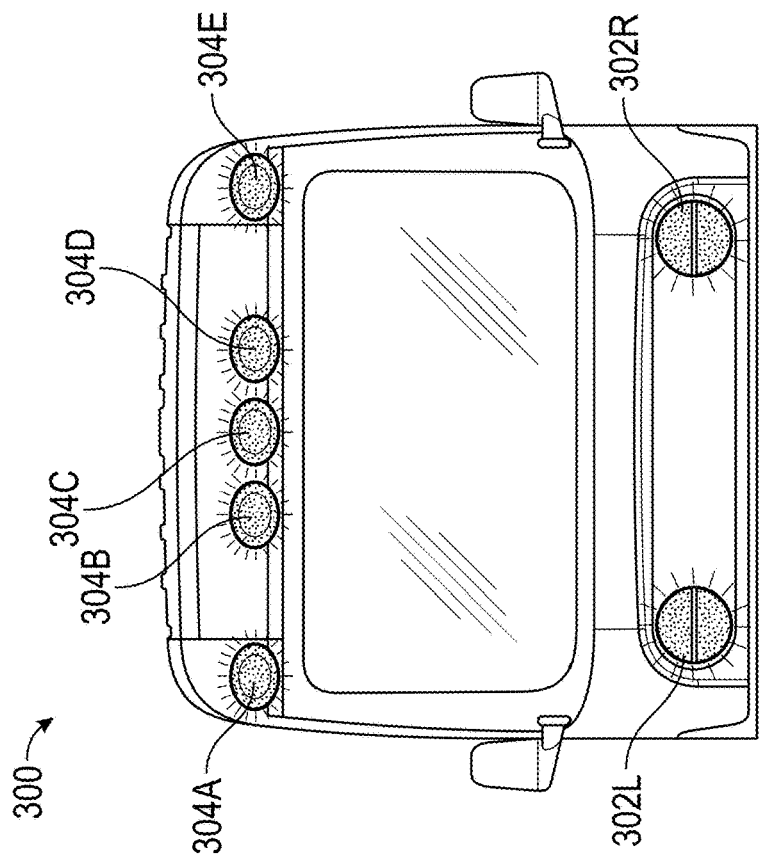
FIG. 3A illustrates an example system for activating front vehicle lamps in a hazard lighting pattern.
Figure 3B:
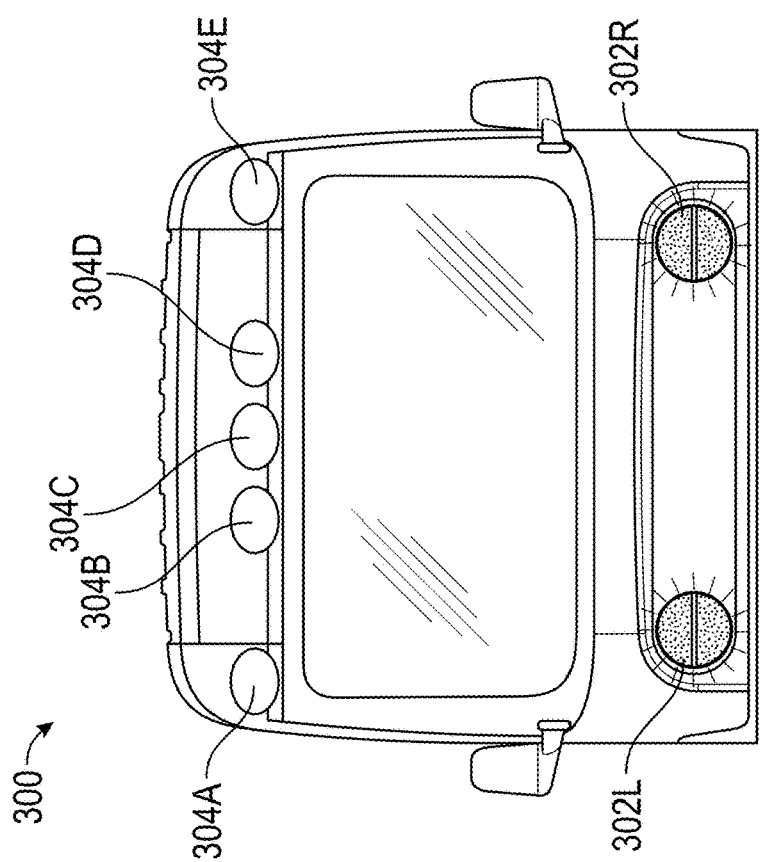
FIG. 3B illustrates an example system for activating front vehicle lamps in a delivery lighting pattern.
Figure 4:
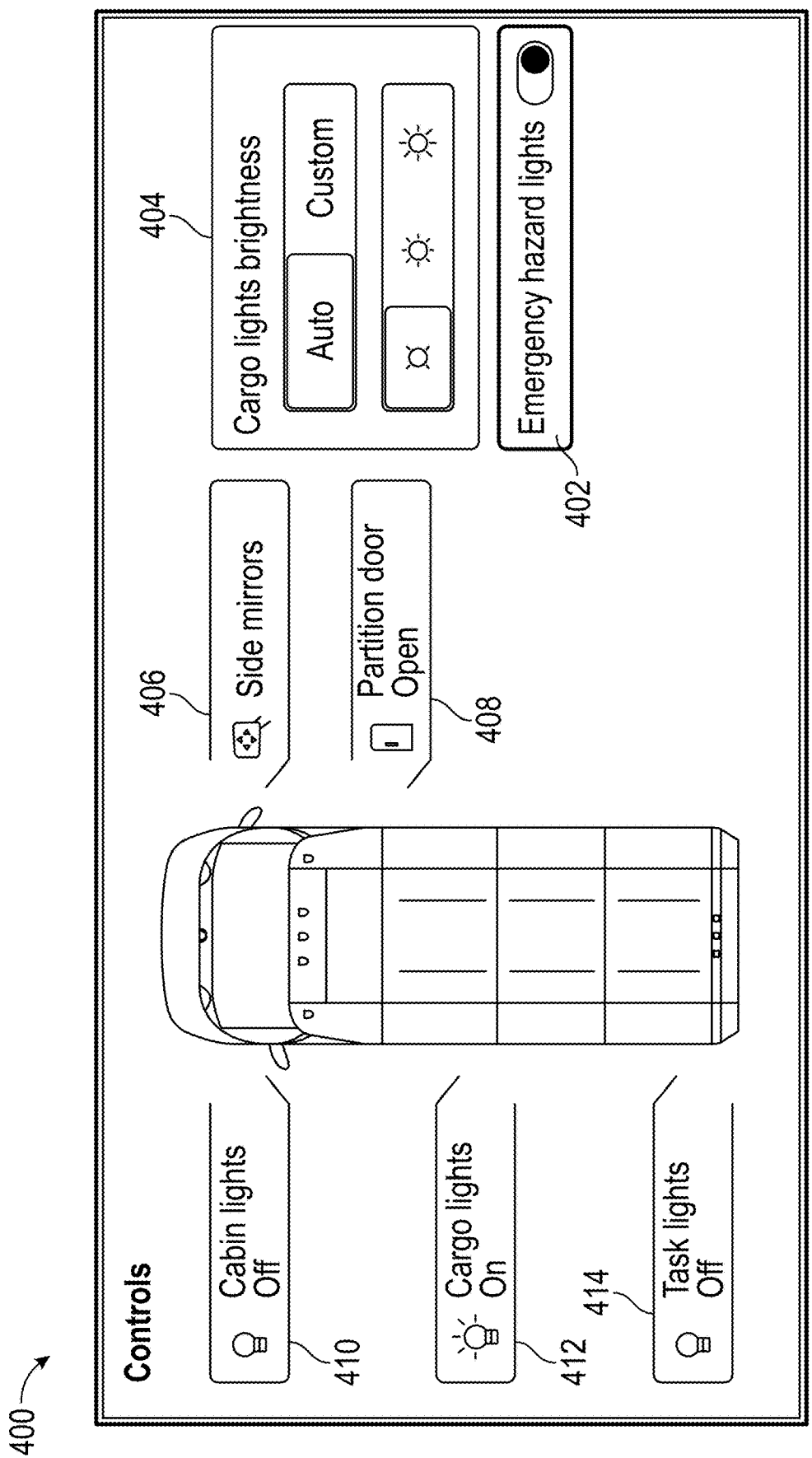
FIG. 4 illustrates an example human machine interface customized for receiving a user instruction to activate vehicle lamps in a delivery lighting pattern.

FIG. 3A illustrates an example system for activating front vehicle lamps in a hazard lighting pattern and FIG. 3B illustrates an example system for activating front vehicle lamps in a delivery lighting pattern. Vehicle 300 includes left and right front turn signal lamps 302L and 304R and roof marker lamps 304A, 304B, 304C, 304D, and 304E. In the hazard lighting pattern, left and right front turn lamps 302L and 302R flash at a first frequency. In the example of FIG. 3A, left and right front turn lamps 302L and 302R are the only front lamps that flash in the hazard lighting pattern. In some embodiments, the flash frequency of left and right turn signals is 2 Hz in a hazard lighting pattern. As explained above, the hazard lighting pattern can be activated via, for example, a user pressing an emergency hazard button and by determining occurrence of certain events (as explained herein). In FIG. 3B, vehicle 300 has activated the left and right front turn lamps 302L and 302R, as in the hazard lighting pattern, and additionally activated roof marker lamps 304A, 304B, 304C, 304D, and 304E located at the top of the vehicle. Thus, vehicle 300 operates vehicles lamps in the delivery lighting pattern differently than in the hazard lighting pattern by activating additional vehicle lamps (in this case roof marker lamps 304A, 304B, 304C, 304D, and 304E). In addition or in the alternative, the activated lamps in the delivery lighting pattern may flash at a second frequency different than the first frequency in the hazard lighting pattern, such as at a frequency at least 1 Hz different than the hazard lighting pattern. In some embodiments, flashing of the additional vehicle lamps is synchronized with other lamps. In other embodiments, flashing of the additional lamps is not synchronized. In some embodiments, the delivery lighting pattern differs from hazard lighting pattern by a flash type, such as pulse length or pulse intensity. In some embodiments, a delivery lighting pattern may differ from the hazard lighting pattern by the colors of lamps.

In some embodiments, the front vehicle lamp lighting patterns of FIGS. 3A and 3B are combined with the rear vehicle lamp lighting patterns of FIGS. 2A and 2B, respectively. Additional lamps (e.g., side repeater lamps (not shown)) may also be activated in the lighting pattern, delivery lighting pattern, or a special lighting pattern (discussed below).

In some embodiments, control system 102 may detect a signal of a crash event (e.g., a signal that an airbag has deployed) and determine one or more of the vehicle's lamps of the hazard lighting pattern are inoperative. This scenario may occur, for example, when the front of a vehicle collides with another vehicle and damages one or more turn signals (e.g., the left and right front turn lamps 302L and 302R). In that situation, activating the hazard lighting pattern may not bring awareness to other drivers and pedestrians because the hazard lighting pattern includes inoperative front turn signals. In response to control system 102 detecting a signal of a crash event (e.g., a signal that an airbag has deployed) and determining (e.g., by loss of communication with a lamp module, by communication with a body control system, a rear zone control system, or a vehicle dynamics control system) that one or more of the vehicle's lamps of the hazard lighting pattern are inoperative, control system 102 may activate a special lighting pattern to compensate. Detecting a signal of a crash event may include control system 102 determining a crash event has occurred. Returning to FIG. 3A and vehicle 300, if a collision renders the left and/or right front turn lamps 302L and 302R inoperative, control system 102 may activate one or more of case roof marker lamps 304A, 304B, 304C, 304D, and 304E. The special lighting can be different from the hazard lighting. In FIGS. 3A and 3B, the special lighting pattern differs from the hazard lighting pattern by activation, in the special lighting pattern, of an additional vehicle lamp that is not activated in the hazard lighting pattern. Other differences could be implemented. For example, the special lighting pattern may differ from the hazard lighting pattern by flashing frequency, such as the differences discussed herein between delivery lighting patterns and hazard lighting patterns. Where a vehicle has both a special lighting pattern and a delivery lighting pattern, the special lighting pattern may be different or the same as a delivery lighting pattern. Other embodiments may also activate vehicle lamps in a special lighting pattern. For example, in response to determining a flat tire event, a rear-door open event, a loose equipment event (e.g., equipment on a roof rack), a covered tail lamp event (e.g., by using sensors in the tail lamps to monitor ambient light), based on a location of a vehicle (e.g., location at a factory or construction site, etc.), based on connection of a charger, a variation in vehicle load, certain vehicle events (e.g., speed is greater than a threshold, rapid deceleration), or an alarm trigger. Further, special lighting patterns can be used to signify a state of the vehicle. For example, other drivers and pedestrians may benefit from a "robot driver" lighting pattern to bring awareness to an autonomous vehicle and/or an autonomous delivery driver. Other special lighting patterns could include a "charging mode" or a "listening mode" of the vehicle, bring awareness of vehicle state to a user of the vehicle.

Some embodiments include automatic deactivation of a delivery lighting pattern or special lighting pattern. For example, control system 102 can detect a signal to deactivate vehicle lamps in the delivery lighting pattern (e.g., detecting that a gear shift has changed from a "park" state to a "drive" state, detecting a hazard button pattern signal has changed from "on" to "off," etc.) and, in response, deactivate the vehicle lamps. In some embodiments, deactivating the vehicle lamps in the delivery lighting condition includes activating vehicle lamps in the hazard lighting pattern or deactivating some or all activated vehicle lamps. The signal to deactivate can include a user instruction (e.g., via a HMI or smart assistant) to discontinue a delivery lighting pattern, a change in parked mode (e.g., a change in a gear shift from a "park" state), a disengaged parking brake, a vehicle is departing from a curb, or a deactivated hazard lighting pattern signal (for example, a hazard button, such as button 106a in FIG. 1, is released). The user instruction can be received by the control system.

FIG. 4 illustrates an example human machine interface customized for activating vehicle lamps in a delivery lighting pattern. HMI 400 includes exemplary user control 402 for selecting emergency hazard lights. HMI 400 also includes other vehicle controls, such as a cargo light brightness control 404, mirrors control 406, door control 408, cabin lights control 410, cargo lights control 412, and task light control 414. The controls depicted in HMI 400 are exemplary. User control 402 may be the source of signal 104 to activate a delivery lighting pattern. In some embodiments, a control system (such as control system 102) detects a user instruction to activate vehicle lamps in the delivery lighting pattern. In some of these embodiments, detecting a user instruction may be a requirement to activating the vehicle lamps in the delivery lighting pattern (or special lighting pattern), in addition or in the alternative to detecting a signal to activate vehicle lamps in the delivery lighting pattern (or special lighting pattern). As described further above, the signal to activate includes determining a delivery event, determining a vehicle is in a parked mode, determining a vehicle parking brake is engaged, determining a vehicle is stopped by regenerative braking, determining a vehicle is slowing and approaching a curb, determining a current location of the vehicle is within a threshold proximity of an area associated with a delivery address, among others. In some embodiments, the area is a geo-fenced area of the delivery address. The proximity threshold may, in some embodiments, be 100-500 meters.

User control 402 may also be the source of a signal to deactivate the delivery lighting pattern. A user can toggle the delivery lighting pattern by changing the position of the radial button associated with Emergency Hazard Lights control 402. It is understood that HMI 400 is provided as a source of a user instruction for illustrative purposes only. In some implementations, the source of a user instruction is a virtual assistant (e.g., a voice-activated smart assistant).

Figure 5:
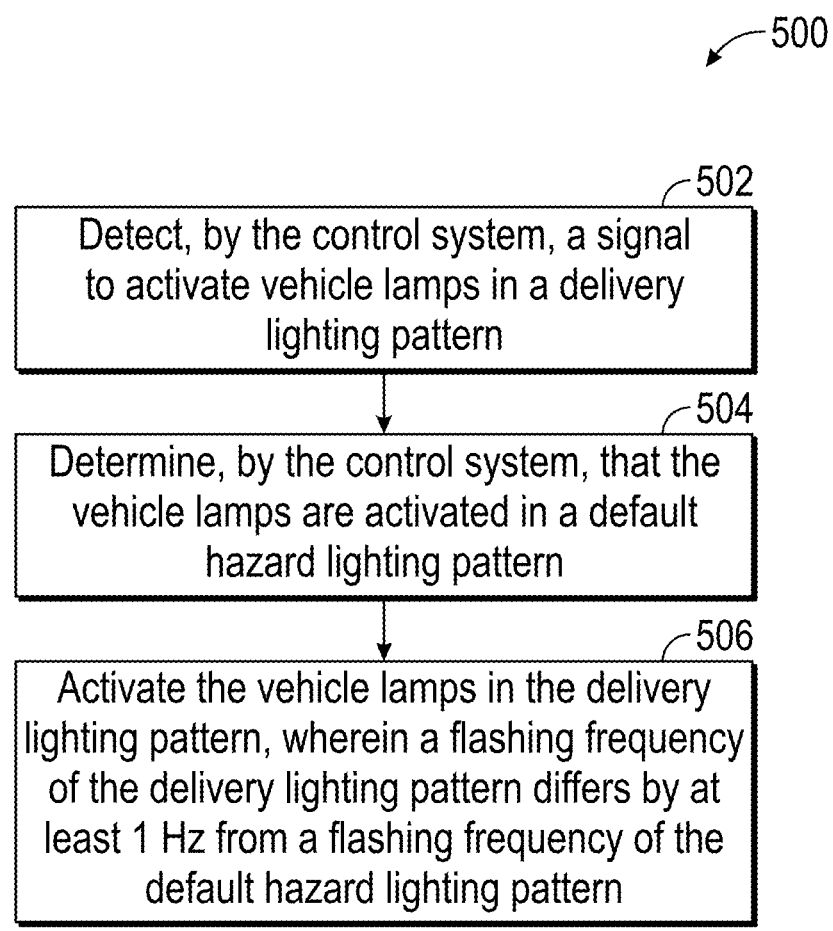
FIG. 5 illustrates an example flow diagram of a method for controlling a vehicle to activate vehicle lamps in a delivery lighting pattern.

FIG. 5 illustrates an example flow diagram of a method 500 for controlling a vehicle to activate vehicle lamps in a delivery lighting pattern. In some implementations, one or more process blocks of FIG. 5 may be performed by a vehicle's control system. The method may begin at step 502 where a signal is detected by a control system and the signal indicates that vehicle lamps are to be activated in a delivery lighting pattern. At step 504, method 500 optionally includes determining, by the control system, that the vehicle lamps are activated in a hazard lighting pattern. Some embodiments of method 500 do not include step 504. At step 506, method 500 may include activating the vehicle lamps in the delivery lighting pattern, where a flashing frequency of the delivery lighting pattern differs from a flashing frequency of a hazard lighting pattern. In some embodiments, the flashing frequency of the delivery lighting pattern differs by at least 1 Hz from the flashing frequency of the lighting pattern. In some embodiments, step 506 may include, in addition or in the alternative to a different flashing frequency, activating (in the delivery lighting pattern) an additional lamp that is not activated in the hazard lighting pattern.

Method 500 may further include determining occurrence of at least one event and, in response to determining occurrence of the at least one event, sending the signal to activate the vehicle lamps in the delivery lighting pattern. In some further aspects, determining occurrence of the at least one event includes determining occurrence of a delivery event, determining the vehicle is in a parked mode, determining the vehicle's parking brake is engaged, determining the vehicle is slowing and approaching a curb, determining the vehicle is stopped by regenerative braking, determining a current location of the vehicle is within a threshold proximity of an area associated with a delivery address (in some embodiments, the area is a geo-fenced area of the delivery address; the proximity threshold may, in some embodiments, be 100-500 meters), determining a vehicle occupant has unbuckled a seat belt (e.g., detecting that a seat belt has changed from a "buckled" state to an "unbuckled" state), determining a vehicle occupant has risen from a chair (e.g., detecting that a seat has changed from an "occupied" state to an "unoccupied" state), and/or determining a vehicle occupant has opened a door of the vehicle (e.g., detecting that a vehicle door has changed from a "closed" to an "opened" state).

Some embodiments of method 500 detect a user instruction to activate vehicle lamps in the delivery lighting pattern. In some of the embodiments that include a step of detecting a user instruction to activate vehicle lamps in the delivery lighting pattern, detecting the signal to activate vehicle lamps in a delivery lighting pattern includes determining the vehicle is in a parked mode and, in response to determining the vehicle is in a parked mode, sending the signal to activate the vehicle lamps in the delivery lighting pattern. In yet further embodiments with a step of detecting a user instruction to activate vehicle lamps in the delivery lighting pattern, detecting the signal to activate vehicle lamps in a delivery lighting pattern includes determining occurrence of at least one event, and, in response to determining occurrence of the at least one event, sending the signal to activate the vehicle lamps in the delivery lighting pattern. Determining occurrence of the at least one event may include, for example, at least one event selected from a delivery event, a vehicle parking brake is engaged, a vehicle is slowing and approaching a curb, a vehicle is stopped by regenerative braking, and a current location of the vehicle is within a threshold proximity of an area associated with a delivery address. In some embodiments, the area is a geo-fenced area of the delivery address. The proximity threshold may, in some embodiments, be 100-500 meters Method 500 includes, in some implementations, determining occurrence of a crash event, determining a vehicle lamp activated in the hazard lighting pattern is inoperative, and activating the vehicle lamps in a special lighting pattern that differs from the hazard lighting pattern. In some such embodiments, the special lighting pattern is the same as a delivery lighting pattern. In some embodiments with an activated special lighting pattern, an additional lamp is activated, where the additional lamp is not activated in the hazard lighting pattern.

Method 500 can include detecting a signal to deactivate vehicle lamps in the delivery lighting pattern and, in response, deactivating the vehicle lamps. In some implementations, deactivating the vehicle lamps in the delivery lighting condition includes activating the hazard lighting pattern or deactivating some or all activated vehicle lamps. The signal to deactivate can include a signal indicating a change in parked mode, a signal indicating a disengaged parking brake, a signal indicating a vehicle is departing from a curb, a signal indicating a moving vehicle, and a signal indicating the vehicle lamps are deactivated from the hazard lighting pattern.

In some aspects of method 500, the method includes determining occurrence of at least one event and, in response to determining occurrence of the at least one event, activating the hazard lighting pattern. The event can include a collision event, a critical stop event, or a thermal event.

In some embodiments, method 500 determines occurrence of a component failure and, in response to determining occurrence of the component failure, activating the vehicle lamps at a flashing frequency that is different from the flashing frequency of the hazard lighting pattern and the flashing frequency of the delivery lighting pattern.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for controlling a vehicle including the particular steps of the method of FIG. 5, this disclosure contemplates any suitable method for controlling a vehicle including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In one aspect, one or more computer-readable non-transitory storage media embodying software may include instructions operable when executed to perform operations to: detect, by a control system, a signal to activate vehicle lamps in a delivery lighting pattern; and activate the vehicle lamps in the delivery lighting pattern.

In some embodiments, the one or more computer-readable non-transitory storage media may further include instructions operable when executed to perform operations to determine occurrence of at least one event and, in response to determining occurrence of the at least one event, send the signal to activate the vehicle lamps in the delivery lighting pattern. In some further aspects, determining occurrence of at least one event includes determining occurrence of a delivery event, determining the vehicle is in a parked mode, determining the vehicle's parking brake is engaged, determining the vehicle is slowing and approaching a curb, determining the vehicle is stopped by regenerative braking, determining a current location of the vehicle is within a threshold proximity of an area associated with a delivery address (in some embodiments, the area is a geo-fenced area of the delivery address; the proximity threshold may, in some embodiments, be 100-500 meters), determining a vehicle occupant has unbuckled a seat belt (e.g., detecting that a seat belt has changed from a "buckled" state to an "unbuckled" state), determining a vehicle occupant has risen from a chair (e.g., detecting that a seat has changed from an "occupied" state to an "unoccupied" state), and/or determining a vehicle occupant has opened a door of the vehicle (e.g., detecting that a vehicle door has changed from a "closed" to an "opened" state).

In some embodiments, the one or more computer-readable non-transitory storage media include instructions to perform operations to detect a user instruction to activate vehicle lamps in the delivery lighting pattern. In some of the embodiments that include a step of detecting a user instruction to activate vehicle lamps in the delivery lighting pattern, detecting the signal to activate vehicle lamps in a delivery lighting pattern includes determining the vehicle is in a parked mode and, in response to determining the vehicle is in a parked mode, sending the signal to activate the vehicle lamps in the delivery lighting pattern. In yet further embodiments where the media include instructions to perform operations to detect a user instruction to activate vehicle lamps in the delivery lighting pattern, detecting the signal to activate vehicle lamps in a delivery lighting pattern includes determining occurrence of at least one event, and, in response to determining occurrence of the at least one event, sending the signal to activate the vehicle lamps in the delivery lighting pattern. Determining occurrence of at least one event may include, for example, at least one event selected from a delivery event, a vehicle parking brake is engaged, a vehicle is slowing and approaching a curb, a vehicle is stopped by regenerative braking, and a current location of the vehicle is within a threshold proximity of an area associated with a delivery address (in some embodiments, the area is a geo-fenced area of the delivery address; the proximity threshold may, in some embodiments, be 100-500 meters).

The one or more computer-readable non-transitory storage media can further include instructions to perform operations to determine occurrence of a crash event, determine a vehicle lamp activated in the hazard lighting pattern is inoperative, and activate the vehicle lamps in a special lighting pattern that differs from the hazard lighting pattern. In some such embodiments, the special lighting pattern is the same as a delivery lighting pattern. In some embodiments with an activated special lighting pattern, an additional lamp is activated in the special lighting pattern that is not activated in the hazard lighting pattern.

The one or more computer-readable non-transitory storage media can, in some aspects, further include instructions to perform operations to detect a signal to deactivate vehicle lamps in the delivery lighting pattern and, in response, deactivate the vehicle lamps. In some implementations, deactivating the vehicle lamps in the delivery lighting condition includes activating the hazard lighting pattern or deactivating some or all activated vehicle lamps. The signal to deactivate can include a signal indicating a change in parked mode, a signal indicating a disengaged parking brake, a signal indicating a moving vehicle, a signal indicating a vehicle is departing from a curb, and a signal indicating the vehicle lamps are deactivated from the hazard lighting pattern.

In some implementations, the media include instructions to perform operations to determine occurrence of at least one event and, in response to determining occurrence of the at least one event, activate the hazard lighting pattern. The event can include a collision event, a critical stop event, or a thermal event.

In some embodiments, the one or more computer-readable non-transitory storage media may further include instructions to perform operations to determine occurrence of a component failure and, in response to determining occurrence of the component failure, activate the vehicle lamps at a flashing frequency that is different from the flashing frequency of the hazard lighting pattern and the flashing frequency of the delivery lighting pattern.

Figure 6:
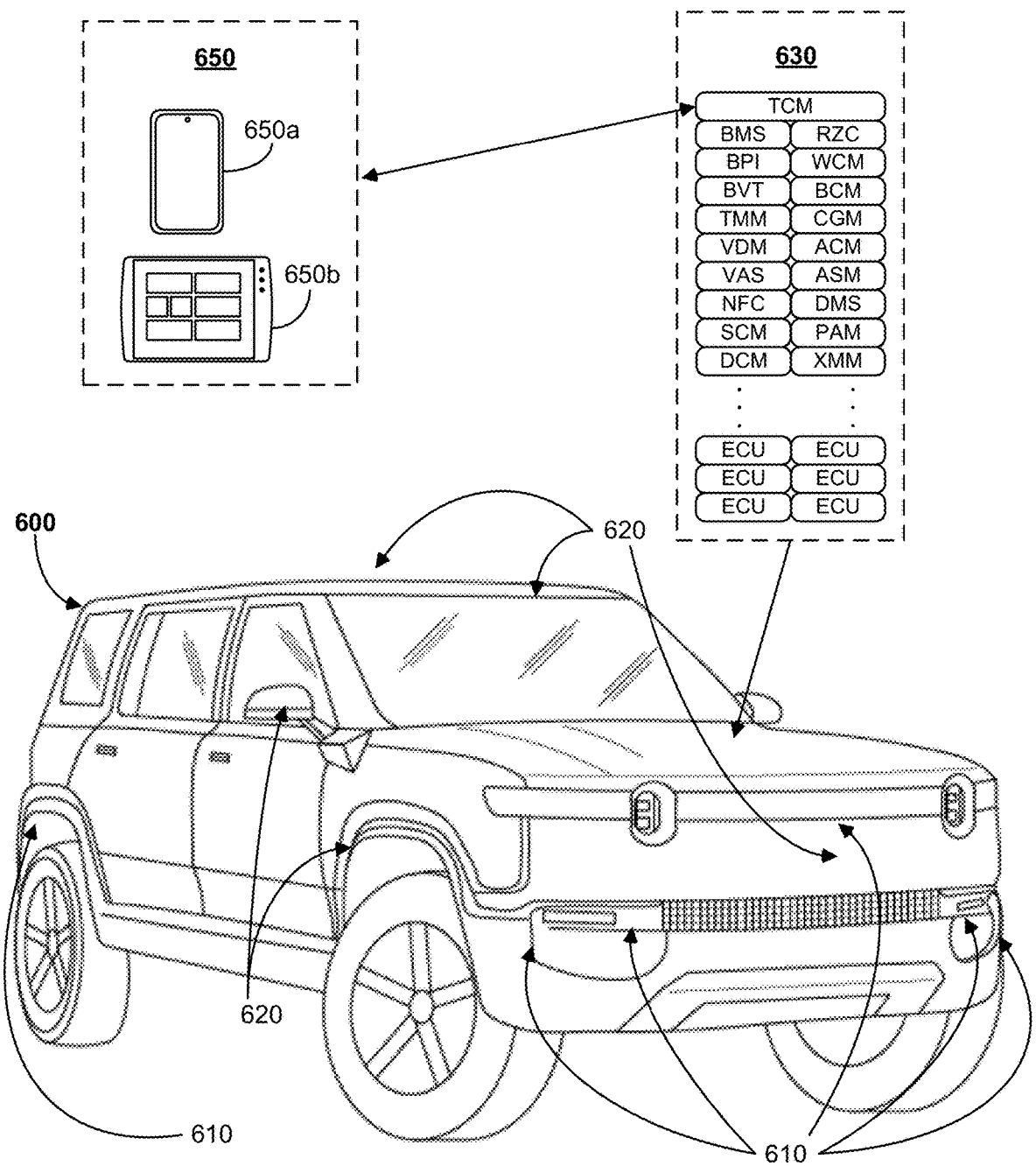
FIG. 6 illustrates an example vehicle.

FIG. 6 illustrates an example vehicle 600. Vehicle 600 may include multiple sensors 610, multiple cameras 620, and a control system 630. In some embodiments, vehicle 600 may be able to pair with a computing device 650 (e.g., smartphone 650a, tablet computing device 650b, or a smart vehicle accessory). As an example and not by way of limitation, a sensor 610 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 620 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 600 may include various controllable components (e.g., doors, seats, windows, lights, HVAC, entertainment system, security system), instrument and information displays and/or interactive interfaces, functionality to pair a computing device 650 with the vehicle (which may enable control of certain vehicle functions using the computing device 650), and functionality to pair accessories with the vehicle, which may then be controllable through an interactive interface in the vehicle or through a paired computing device 650.

Control system 630 may enable control of various systems on-board the vehicle. As shown in FIG. 6, control system 630 may comprise one or more electronic control units (ECUs), each of which are dedicated to a specific set of functions. Each ECU may be a computer system (as described further in FIG. 7), and each ECU may include functionality provide by one or more of the example ECUs described below.

Features of embodiments as described herein may be controlled by one or more ECUs that provide functionality related to the battery pack of the vehicle. A Battery Management System (BMS) ECU may control and monitor a number of different aspects related to the electric vehicle battery system. Functions that may be controlled by the BMS may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with the Battery Power Isolation (BPI) and Balancing Voltage Temperature (BVT) ECUs, and calculate state-of-charge (SoC) and battery state-of-health (SoH). A BPI ECU may provide high-voltage sensing, measure the battery pack current, and facilitate determination of pack isolation. A BVT ECU may monitor battery module cell voltages, monitor temperature, and execute cell balancing.

Features of embodiments as described herein may be controlled by a Thermal Management Module (TMM) ECU. The TMM ECU may provide electronic controls for HVAC components that control the temperature within a passenger cabin of the vehicle, including, by way of example and not limitation, sensing cabin temperature, heating and cooling of the cabin, and controlling HVAC mode (foot mode, defrost/demist), the electronic air compressor, the HVAC blower, the air vents, and the cabin heater. The TMM ECU may also or alternatively control heating and cooling of the battery pack and cooling of drive units (inverters), including, by way of example and not limitation, controlling the speed of the radiator fan, heating and cooling of energy storage system (ESS), monitoring ESS coolant temperature sensors, cooling of powertrain, and monitoring powertrain coolant temperature sensors.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 650, in-vehicle navigation, vehicle-to-vehicle communication, communication between the vehicle and landscape features (e.g., automated toll road sensors, automated toll gates, power dispensers at charging stations), or automated calling functionality.

A Restraints Control Module (RCM) ECU may provide functionality to control components of a passive safety system of the vehicle (e.g., automatically tensioning seat belts, air bags, car seat or booster seat for a baby, child, or animal), such as, by way of example and not limitation, sensing a roll, pitch, or yaw movement of the vehicle or sensing whether components of the passive safety system are in use for one or more vehicle occupants.

Features of embodiments as described herein may be controlled by a Rear Zone Control (RZC) ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by one or more ECUs may provide functions of an automated driving system (ADS) and/or an advanced driver assistance system (ADAS) that may be enabled by a driver of the vehicle to provide one or more functions to support driving assistance and/or automation. An Autonomy Control Module (ACM) ECU may process data captured by cameras 620 and/or sensors 610. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 620 and/or sensors 610 in order to determine appropriate control commands.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, HVAC controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 630. In some embodiments, functions of the ACM and the XMM may be combined together into an Autonomous eXperience Module (AXM) ECU.

Vehicle 600 may include one or more additional ECUs, such as, by way of example and not limitation: a Vehicle Access System (VAS) ECU, a Near-Field Communication (NFC) ECU, a Seat Control Module (SCM) ECU, a Door Control Module (DCM) ECU, and/or a Winch Control Module (WCM) ECU.

Figures 7A, 7B:
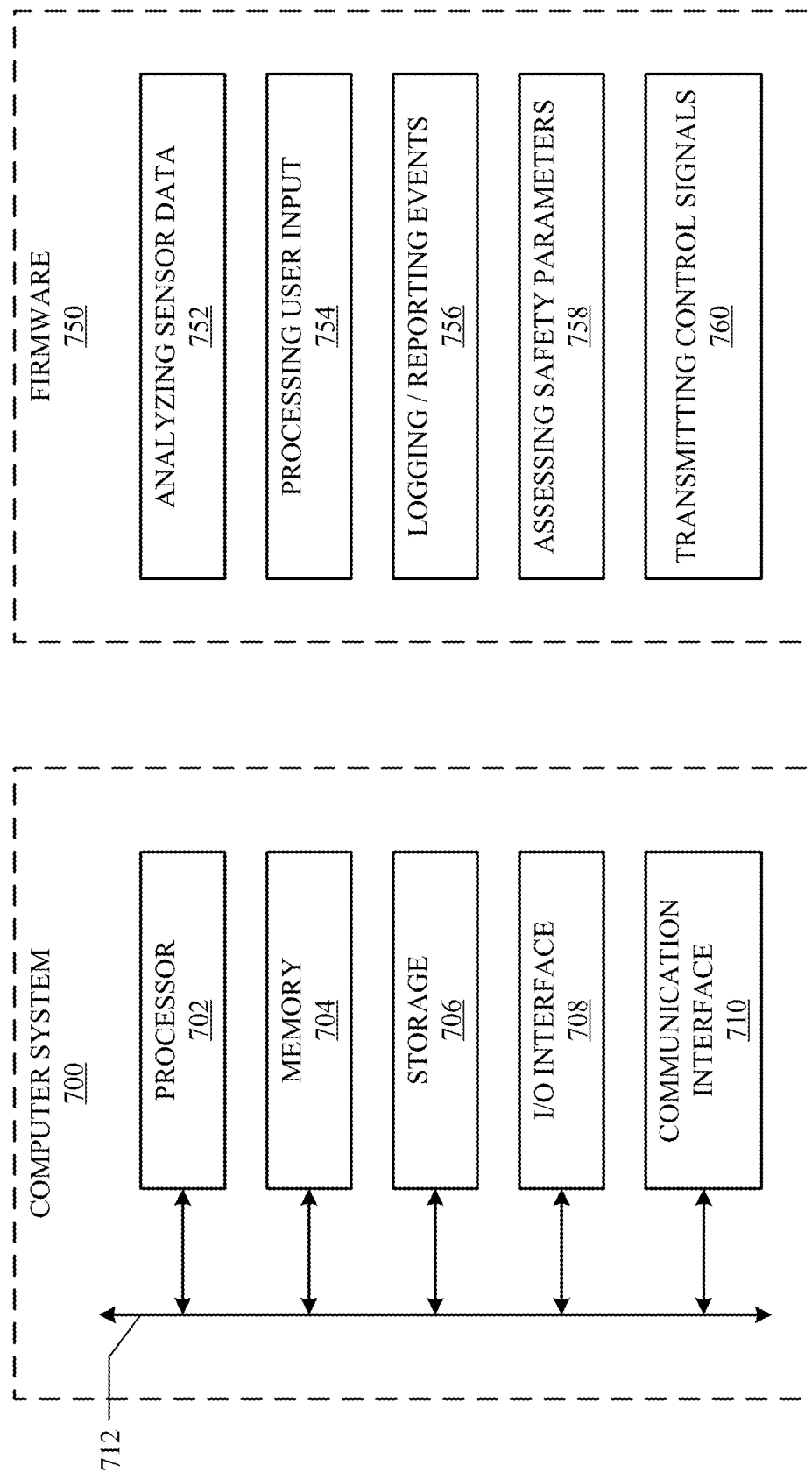
FIG. 7A is a schematic of an example computer system.
FIG. 7B illustrates example firmware for a vehicle ECU.

FIG. 7A illustrates an example computer system 700. Computer system 700 may include a processor 702, memory 704, storage 706, an input/output (I/O) interface 708, a communication interface 710, and a bus 712. Although this disclosure describes one example computer system including specified components in a particular arrangement, this disclosure contemplates any suitable computer system with any suitable number of any suitable components in any suitable arrangement. As an example and not by way of limitation, computer system 700 may be an ECU, an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 700 may include one or more computer systems 700; be unitary or distributed, span multiple locations, machines, or data centers; or reside in a cloud, which may include one or more cloud components in one or more networks. Where appropriate, computer system(s) 700 may perform, at different times or at different locations, in real time or in batch mode, one or more steps of one or more methods described or illustrated herein.

Processor 702 (e.g., compute units &22 and &32) may include hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706 (e.g., storage units &24 and &34). Processor 702 may include one or more internal caches for data, instructions, or addresses.

In particular embodiments, memory 704 includes main memory for storing instructions for processor 702 to execute or data for processor 702 to operate on. In particular embodiments, one or more memory management units (MMUs) reside between processor 702 and memory 704 and facilitate accesses to memory 704 requested by processor 702. In particular embodiments, memory 704 includes random access memory (RAM). This disclosure contemplates any suitable RAM.

In particular embodiments, storage 706 includes mass storage for data or instructions. As an example and not by way of limitation, storage 706 may include a removable disk drive, flash memory, an optical disc, a magneto-optical disc, magnetic tape, or a Universal Serial Bus (USB) drive or two or more of these. Storage 706 may include removable or fixed media and may be internal or external to computer system 700. Storage 706 may include any suitable form of non-volatile, solid-state memory or read-only memory (ROM).

In particular embodiments, I/O interface 708 includes hardware, software, or both, providing one or more interfaces for communication between computer system 700 and one or more input and/or output (I/O) devices. Computer system 700 may be communicably connected to one or more of these I/O devices, which may be incorporated into, plugged into, paired with, or otherwise communicably connected to vehicle 600 (e.g., through the TCM ECU). An input device may include any suitable device for converting volitional user input into digital signals that can be processed by computer system 700, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 610 described above. An output device may include devices designed to receive digital signals from computer system 700 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 708 for them. I/O interface 708 may include one or more I/O interfaces 708, where appropriate.

In particular embodiments, communication interface 710 includes hardware, software, or both providing one or more interfaces for data communication between computer system 700 and one or more other computer systems 700 or one or more networks.

Communication interface 710 may include one or more interfaces to a controller area network (CAN) or to a local interconnect network (LIN). Communication interface 710 may include one or more of a serial peripheral interface (SPI) or an isolated serial peripheral interface (isoSPI). In some embodiments, communication interface 710 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 712 includes hardware, software, or both coupling components of computer system 700 to each other. Bus 712 may include any suitable bus, as well as one or more buses 712, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 7B illustrates example firmware 750 for a vehicle ECU 700 as described with respect to control system 630. Firmware 750 may include functions 752 for analyzing sensor data based on signals received from sensors 610 or cameras 620 received through communication interface 710. Firmware 750 may include functions 754 for processing user input (e.g., directly provided by a driver of or passenger in vehicle 600, or provided through a computing device 650) received through I/O interface 708. Firmware 750 may include functions 756 for logging detected events (which may be stored in storage 706 or uploaded to the cloud), as well as functions for reporting detected events (e.g., to a driver or passenger of the vehicle through an instrument display or interactive interface of the vehicle, or to a vehicle manufacturer, service provider, or third party through communication interface 710). Firmware 750 may include functions 758 for assessing safety parameters (e.g., monitoring the temperature of a vehicle battery or the distance between vehicle 600 and nearby vehicles). Firmware 750 may include functions 760 for transmitting control signals to components of vehicle 600, including other vehicle ECUs 700.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. It should also be understood that as used in the description herein and throughout the claims that follow, the meaning of "a," "an," and "the" includes plural reference unless the context clearly dictates otherwise.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A control system of a vehicle, comprising:
one or more processors and a memory comprising instructions executable by the processors, the instructions configuring the one or more processors to:
determine that the vehicle is slowing and approaching a curb;
detect a signal to activate vehicle lamps in a delivery lighting pattern based on the determination that the vehicle is slowing and approaching the curb; and
activate the vehicle lamps in the delivery lighting pattern, wherein a flashing frequency of the delivery lighting pattern differs from a flashing frequency of a hazard lighting pattern.

2. The control system of claim 1, wherein the signal to activate the vehicle lamps in the delivery lighting pattern being detected comprises the one or more processors being configured to:
determine an occurrence of a delivery event, wherein the signal to activate the vehicle lamps in the delivery lighting pattern is further based on the determination of the occurrence of the delivery event.

3. The control system of claim 1, wherein the signal to activate the vehicle lamps in the delivery lighting pattern being detected comprises the one or more processors being configured to:
determine the vehicle is in a parked mode, wherein the signal to activate the vehicle lamps in the delivery lighting pattern is further based on the determination that the vehicle is in the parked mode.

4. The control system of claim 1, wherein the signal to activate the vehicle lamps in the delivery lighting pattern being detected comprises the one or more processors being configured to:
determine the vehicle is stopped by regenerative braking, wherein the signal to activate the vehicle lamps in the delivery lighting pattern is further based on the determination that the vehicle was stopped by the regenerative braking.

5. The control system of claim 1, wherein the one or more processors are further configured to:
receive a user instruction to activate vehicle lamps in the delivery lighting pattern.

6. The control system of claim 1, wherein a flashing frequency of the delivery lighting pattern differs by at least 1 Hz from a flashing frequency of the hazard lighting pattern.

7. The control system of claim 1, wherein the one or more processors are further configured to:
activate, in the delivery lighting pattern, an additional lamp that is not activated in the hazard lighting pattern.

8. The control system of claim 1, wherein the one or more processors are further configured to:
determine occurrence of a crash event;
determine a first vehicle lamp of the vehicle lamps configured to activate in the hazard lighting pattern is inoperative; and
activate a second vehicle lamp of the vehicle lamps in a special lighting pattern.

9. The control system of claim 1, wherein the one or more processors are further configured to:
detect, by the control system, a signal to deactivate vehicle lamps in the delivery lighting pattern, wherein the signal to deactivate comprises at least one signal selected from the group consisting of a signal indicating a change in parked mode, a signal indicating the vehicle is departing from the curb, a signal indicating a moving vehicle, and a signal indicating deactivated hazard lamps; and
deactivate the vehicle lamps in the delivery lighting pattern.

10. The control system of claim 1, wherein the one or more processors are further configured to:
receive a signal to activate the vehicle lamps in the hazard lighting pattern; and
in response to receiving the signal to activate the vehicle lamps in the hazard lighting pattern and detecting the signal to activate the vehicle lamps in the delivery lighting pattern, activate the vehicle lamps in the hazard lighting pattern.

11. The control system of claim 1, wherein the flashing frequency of the hazard lighting pattern is 2 Hz, wherein the flashing frequency of the delivery lighting pattern is 6 Hz, and wherein the one or more processors are further configured to:
determine an occurrence of a component failure; and
in response to determining occurrence of the component failure, activate the vehicle lamps at a flashing frequency of 4 Hz.

12. One or more computer-readable non-transitory storage media embodying software comprising instructions operable when executed to perform operations comprising:
- determining, by a control system, that a current location of a vehicle is within a threshold proximity of an area associated with a delivery address;
- detecting, by the control system, a signal to activate vehicle lamps in a delivery lighting pattern based on the determination that the current location of the vehicle is within the threshold proximity; and
- activating, by the control system, the vehicle lamps in the delivery lighting pattern, wherein a flashing frequency of the delivery lighting pattern differs from a flashing frequency of a hazard lighting pattern.

13. The one or more computer-readable non-transitory storage media of claim 12, wherein a flashing frequency of the delivery lighting pattern differs by at least 1 Hz from a flashing frequency of the hazard lighting pattern.

14. The one or more computer-readable non-transitory storage media of claim 12, wherein the operations further comprise:
- activating, in the delivery lighting pattern, an additional lamp that is not activated in the hazard lighting pattern.

15. The one or more computer-readable non-transitory storage media of claim 12, wherein the operations further comprise:
- detecting, by the control system, a signal to deactivate the vehicle lamps in the delivery lighting pattern, wherein the signal to deactivate comprises at least one signal selected from the group consisting of a signal indicating a change in parked mode, a signal indicating the vehicle is departing from a curb, a signal indicating a moving vehicle, and a signal indicating deactivated hazard lamps; and
- deactivating the delivery lighting pattern.

16. A vehicle comprising:
- a plurality of lamps; and
- a control system comprising one or more processors and a memory comprising instructions executable by the processors, the one or more processors operable to execute the instructions to:
  - determine that the vehicle is slowing and approaching a curb;
  - detect a signal to activate vehicle lamps of the plurality of lamps in a delivery lighting pattern based on the determination that the vehicle is slowing and approaching the curb; and
  - activate the vehicle lamps in the delivery lighting pattern, wherein a flashing frequency of the delivery lighting pattern differs from a flashing frequency of a hazard lighting pattern.

17. The vehicle of claim 16, wherein the one or more processors is further caused to:
- activate, in the delivery lighting pattern, an additional lamp that is not activated in the hazard lighting pattern.

18. The vehicle of claim 16, wherein the one or more processors are further caused to:
- determine that at least one event has occurred, the at least one event being selected from a group comprising: the vehicle is in a parked mode, a vehicle is stopped by regenerative braking, or a current location of the vehicle is within a threshold proximity of an area associated with a delivery address, wherein the signal to activate the vehicle lamps in the delivery lighting pattern is based on the determination that the at least one event has occurred.

19. A control system of a vehicle, comprising:
- one or more processors and a memory comprising instructions executable by the processors, the instructions configuring the one or more processors to:
  - determine that a current location of a vehicle is within a threshold proximity of an area associated with a delivery address;
  - detect a signal to activate vehicle lamps in a delivery lighting pattern based on the determination that the current location of the vehicle is within the threshold proximity; and
  - activate the vehicle lamps in the delivery lighting pattern, wherein a flashing frequency of the delivery lighting pattern differs from a flashing frequency of a hazard lighting pattern.

20. The control system of claim 19, wherein the signal to activate vehicle lamps in the delivery lighting pattern being detected comprises the one or more processors being configured to:
- determine an occurrence of a delivery event, wherein the signal to activate the vehicle lamps in the delivery lighting pattern is further based on the determination of the occurrence of the delivery event.

* * * * *

UNITED STATES PATENT AND TRADEMARK OFFICE
CERTIFICATE OF CORRECTION

| | |
|---|---|
| PATENT NO. | : 11,945,366 B2 |
| APPLICATION NO. | : 17/848651 |
| DATED | : April 2, 2024 |
| INVENTOR(S) | : Simon Baker et al. |

Page 1 of 1

It is certified that error appears in the above-identified patent and that said Letters Patent is hereby corrected as shown below:

On the Title Page

Under item (72) Inventors: "Stuart Brown, Wilshire (GB)" should read --Stuart Brown, Wiltshire (GB)--.

In the Claims

Column 24, Line 38 (Claim 22): "activate vehicle lamps in the delivery lighting pattern being" should read --activate the vehicle lamps in the delivery lighting pattern being--.

Signed and Sealed this
Fourteenth Day of May, 2024

Katherine Kelly Vidal
*Director of the United States Patent and Trademark Office*